United States Patent [19]

Nieradka et al.

[11] Patent Number: 5,123,891
[45] Date of Patent: Jun. 23, 1992

[54] BOX MACHINE DIE KNIFE STABILIZER

[75] Inventors: Zigmunt Nieradka, Burbank; Robert W. Young, Hinsdale, both of Ill.

[73] Assignee: Westvaco Corporation, New York, N.Y.

[21] Appl. No.: 732,120

[22] Filed: Jul. 18, 1991

[51] Int. Cl.⁵ .............. F16C 17/04; F16C 23/02; B31F 1/10; B26D 1/24

[52] U.S. Cl. .............. 493/370; 493/471; 493/475; 83/499; 384/248; 384/308

[58] Field of Search .............. 384/248, 308; 83/499; 493/365, 367, 370, 403, 471, 475

[56] References Cited

U.S. PATENT DOCUMENTS

| | | | |
|---|---|---|---|
| 2,453,182 | 11/1948 | Bechler | 284/248 |
| 2,621,090 | 12/1952 | Lakey | 384/308 |
| 4,456,391 | 6/1984 | New | 384/308 |
| 4,926,730 | 5/1990 | Garrett | 83/499 |
| 4,936,818 | 6/1990 | Holohan | 493/471 |
| 4,970,924 | 11/1990 | Capdeboscq | 493/471 |
| 5,048,388 | 9/1991 | Kobayashi et al. | 83/499 |
| 5,057,068 | 10/1991 | Capdeboscq | 493/475 |

OTHER PUBLICATIONS

"Long-Life Yokes and Heads for Flexo Folder Gluers", Brochure, Gartech Manufacturing Co. n.d.

Primary Examiner—William E. Terrell
Attorney, Agent, or Firm—W. A. Marcontell; R. L. Schmalz

[57] ABSTRACT

Box machine forming wheels are individually stabilized with a respective, frame mounted, stationary yoke disposed within the circumferential groove of a head wheel that is rigidly secured to the forming wheel. Lateral space between the yoke finger faces and the rotating groove walls is adjustably filled by rub plates mounted on dowel pins confined within yoke finger guide bores. A cone tipped adjustment screw cooperates with conical tips on the dowel pins to selectively expand the rub plate assembly for operational wear accommodation.

6 Claims, 2 Drawing Sheets

BOX MACHINE DIE KNIFE STABILIZER

BACKGROUND OF THE INVENTION

1. Field of the Invention

The present invention relates to machinery for forming box blanks from corrugated paperboard sheet material.

2. Description of the Prior Art

Corrugated paperboard box blanks are fabricated from uniform corrugated sheet material by the selective placement of scores, slots and slits in a blank sheet. Such scores, slots and slits are applied by rotary dies or knives as individual sheet units are nip driven along a machine path between respective die or knife sets.

At commerical production rates and speeds, this material forming process represents severe service for the production machinery due to the strength, stiffness and abrasiveness of the process material. One consequence of such service severity is a tendency of the mating die and knife sets to laternally misalign under the operational stress. Cutting and scoring edges destructively clash together.

To reduce and control such damaging misalignment, these rotary units have been laterally stabilized with a rotational thrust bearing mechanism characterized as a "yoke" and "head" set. Each rotary die, knife or scoring wheel is integrally paired with a massive annular groove wheel called a "head." A cooperative "yoke" includes two finger projections from an integral heel section that is secured to the machine frame. Tips of the finger projections mesh with the head groove space on diametrically opposite sides of the wheel unit. Bushing pads or bearings secured to the stationary yoke tips slide in contact with the rotating head groove walls. Lateral stress on the die, knife or scoring wheel is directly transferred to and resisted by the yoke fingers. Simultaneously, however, wear loss of the finger bushing pad material increasingly reduces the sliding contact bias against the head groove walls. After sufficient wear, the bushing pads must be either replaced or repaired. Repair constitutes the insertion of a shim between the bushing pad and the finger structure. In either case, repair or replacement, correction is time consuming and expensive due to the consequential loss of production time.

In recognition of this maintenance burden against corrugated box making machinery, the Gartech Manufacturing Co. of Lithchfield, Ill. has introduced a stabilizer assembly design which includes two roller bearings mounted within each yoke finger in lieu of traditional bushing pads. These two roller bearings are transversely positioned across the finger thickness whereby each outer race surface runs against a respective head groove wall.

Although the Gartech stabilizer assembly design is an effective solution to the maintenance burdens created by yoke trust pad wear, the design is sufficiently expensive to manufacture as to largely negate the maintenance savings from the design.

It is, therefore, an objective of the present invention to provide a corrugated box machine rotational stabilizer assembly that is both inexpensive to manufacture and requires no machine down time to adjust.

Another object of the present invention is to provide an adjustable thrust bushing mechanism for corrugated boxy machine rotational stabilizers that will fit within the dimensional confines of traditional head grooves and yoke fingers.

Another object of the present invention is to provide an adjustable thrust bushing mechanism for corrugated box machine rotational stabilizers that may be adjusted for wear without interrupting the machine operation.

SUMMARY OF THE INVENTION

These and other objects of the invention are accomplished by means of an expansible yoke bushing. A pair of bushing pads are positioned on opposite faces of a yoke finger in the area of head groove space penetration. Both bushing pads are confined to laterally outward movement against the head groove walls by axially sliding dowel pins. Corresponding dowel bores within respective yoke fingers are axially continuous between opposite finger faces. Axially intersecting each dowel bore from the outer finger edge is a threaded screw bore. Inner ends of opposite bushing pad dowels are conically tapered at an angle corresponding to the conical end taper of an adjusting screw.

As the bushing pad faces wear from sliding contact with the head groove side walls, the resulting clearance space is periodically closed by advancing the adjusting screw. The conical end of the adjusting screw bears against the dowel pin end cones to ramp the cones and bushings outwardly toward the head groove wall faces.

BRIEF DESCRIPTION OF THE DRAWINGS

Relative to the drawings wherein like reference characters designate like or similar elements throughout the several figures of the drawings.

DESCRIPTION OF THE PREFERRED EMBODIMENT

Corrugated box blank forming machines comprise a series of operating stations along a material travel route. Functionally, a blank sheet of corrugated board is cut to final blank size, side walls are segregated by slotting and slitting and fold lines are scored. Each of these operations is executed between a pair of axle shaft carried tool wheels. The tool wheels carry a respective operating tool, be it a die knife meshing with a die anvil or a score ridge meshing with a score groove. Rotation of the wheel carriage axles and placement of one or more operating tools around the wheel circumference is coordinated to apply the desired operation to the box blank as it advances between these wheels along the material travel route.

Figure 1:
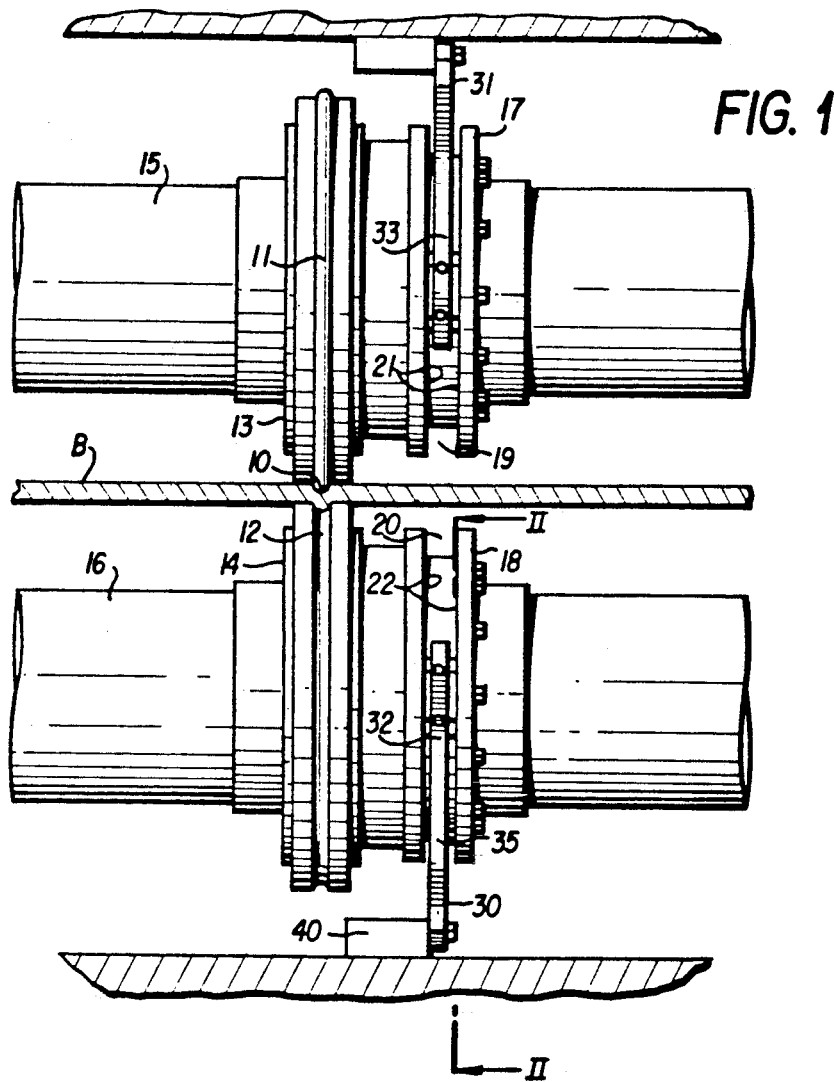
FIG. 1 is a elevational view of a cooperative pair of box blank scoring wheels stabilized by the present invention.

FIG. 1 illustrates a typical scoring station whereat a box blank portion B receives a score line 10 between a circular, tool wheel carried ridge 11 and a circular, tool wheel carried groove 12. It will be understood by those with skill in the art that in lieu of the scoring ridge and groove, the tool carrier wheels may just as well carry a die knife or die anvil.

Tool carriage wheels 13 and 14 are respectively driven rotatively by parallel axles 15 and 16. Each tool carriage wheel is provided with a grooved head wheel 17 and 18, respectively, and the two are rigidly unitized and secured to a respective axle. The groove 19 and 20 respective to each head wheel 17 and 18 are formed between oppositely facing parallel groove walls 21 and 22.

Figure 2:
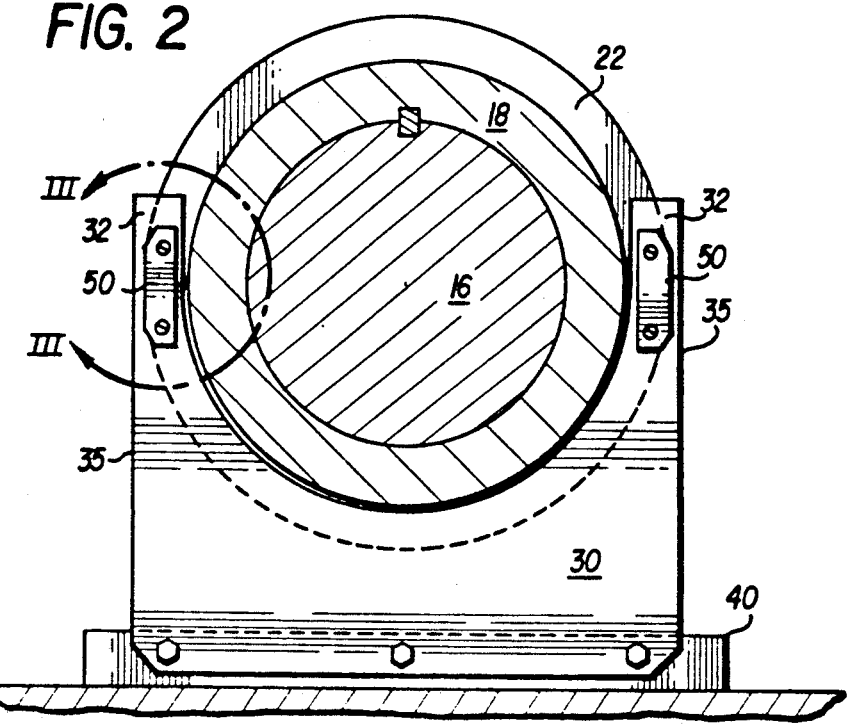
FIG. 2 is a sectional end elevation viewed along the cutting plane of II—II in FIG. 1.
Figure 3:
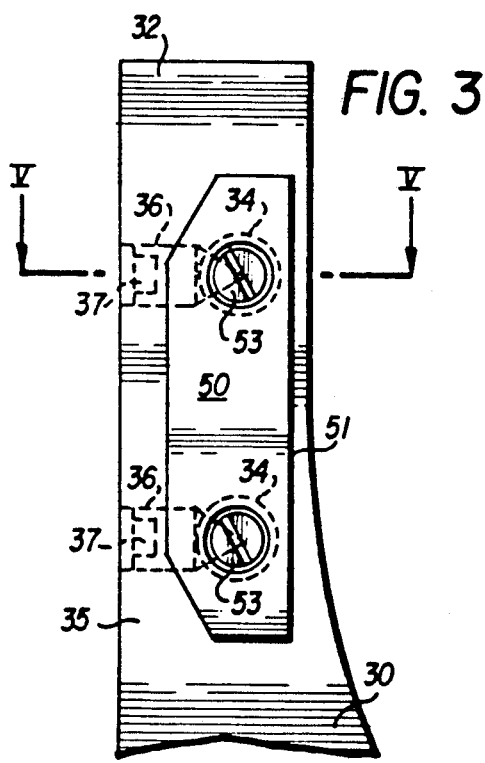
FIG. 3 is a side view of a yoke finger tip equipped with the present invention.
Figure 4:
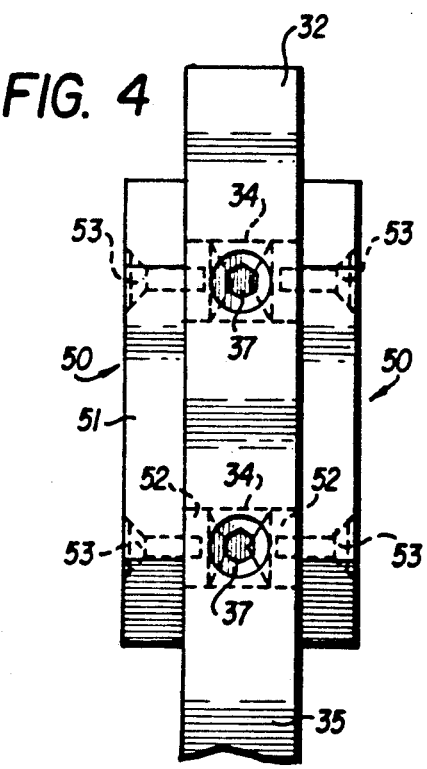
FIG. 4 is an end view of a yoke finger tip equipped with the present invention.

For each head wheel, a yoke plate 30 and 31 is rigidly secured to a frame member 40 in planar alignment with corresponding head grooves 19 and 20. Each yoke plate 30 and 31 includes a pair of finger projections 32 and 33 from a heel base aligned within respective head grooves 20 and 19. Secured to the opposite finger side faces are bushing pads 50 as shown clearly by the FIG. 2 section and the details of FIGS. 3, 4 and 5.

Each pad 50 comprises the unit assembly of a rub or thrust bearing plate 51 and two, conical-end dowel pins 52. Flat head machine screws 53 secure the dowel pins 52 to the rub plate 51. These dowel pins 52 are sized for a close, axially sliding fit into corresponding bore holes 34 passing through the thickness of finger 32 between opposing side face planes.

Figure 5:
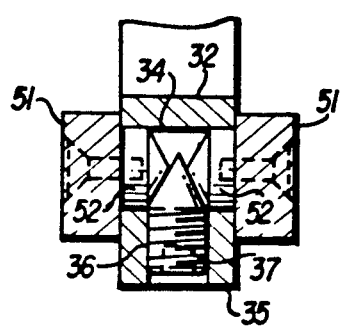
FIG. 5 is a sectional plan view of the invention as viewed along the cutting plane of V—V in FIG. 3.

From the outer edge face of the finger 32, threaded bores 36 penetrate the finger body in perpendicular axial alignment with the axes of dowel bores 34. Conical-end set screws 37 are turned into the threaded bores 36 to engage the conical ends of dowels 52. It is to be noted that the conical angle for the dowel pin ends should compliment the conical angle of the set screw end to provide a continuous line of contact between adjacent elements as shown by FIG. 5. Cooperatively, advancement of the set screw 37 into its respective threaded bore 36 axially displaces the opposite dowel pins 52 and, hence, rub plates 52.

An alternative, non-illustrated adjustment wedging mechanism may include tapered planes on the ends of dowel pins 52 that are displaced by a conical-end adjustment screw 32, perhaps, an independent, non-rotating end wedge that is axially displaced by the rotating set screw 37.

Figure 6:
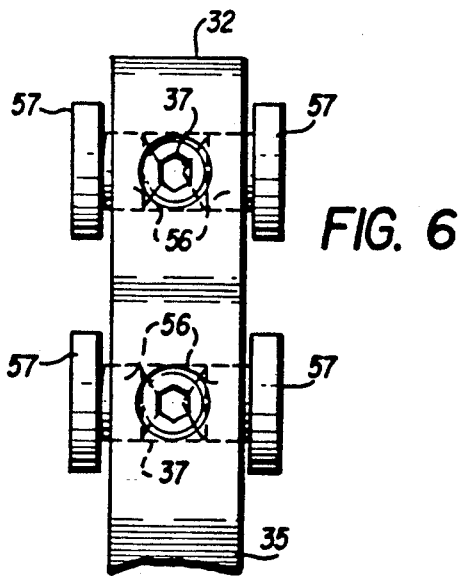
FIG. 6 is an end elevation of a yoke finger tip equipped with an alternative embodiment of the invention.
Figure 7:
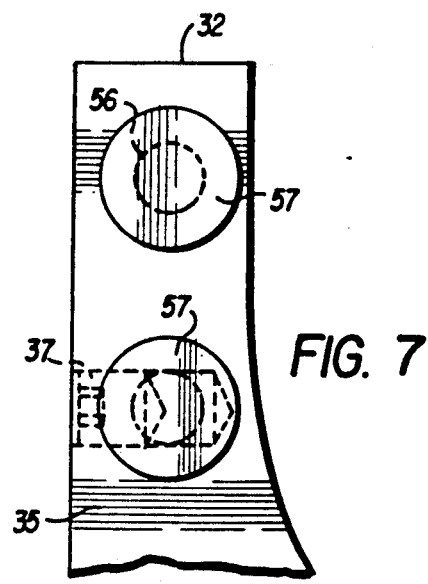
FIG. 7 is a side elevation of a yoke finger tip equipped with an alternative embodiment of the invention.

The invention embodiment of FIGS. 6 and 7 is operatively similar to that of the foregoing description except that each dowel pin 56 is provided with a respective rub disc 57. In this embodiment, both dowel and disc may be utilized as an integral material turning.

Use of the invention will be obvious from the foregoing assembly description as requiring nothing more than a twist of the adjustment screws 37. Advancement of the adjustment screws symmetrically displaces an opposing pair of bushing pads 50 toward the head wheel groove side walls.

Access to the adjustment screws is faciliated by their outer yoke edge 35 location which is safely removed from the rotating tool nip. Although box production may be briefly interrupted during adjustment, machine stoppage is unnecessary.

Having fully described our invention, we claim:

1. Thrust adjustment means for a box machine tool wheel stabilizing yoke which comprises a yoke plate having finger-like projections from a base portion thereof, said base portion adapted for rigid attachment to a stationary structural portion of a box machine, said projections having parallel opposing face planes separated by a distance less than the separation distance between opposing groove wall planes respective to a cooperative stabilizing head wheel, said projections also having inner and outer edges thereof, a dowel bore extended axially through said projections between said face planes and substantially perpendicular thereto, planar thrust plate means positioned adjacent said face planes and substantially parallel therewith, dowel pin means secured at one end thereof to said thrust plate means and slidably carried within said dowel bore means for axial movement therewithin, an other end of said dowel pin means having a tapered surface, a threaded bore within said projections extending from said outer edges to junction with said dowel bore, and, adjustment screw means threaded within said threaded bore having a tapered end thereof to compliment said dowel pin end whereby threaded advancement of said adjustment screw means axially displaces said dowel pin and said thrust plate means toward a head wheel groove wall.

2. Thrust plate adjustment means as described by claim 1 wherein each thrust plate means is retained by at least two dowel pins.

3. Thrust plate adjustment means as described by claim 1 wherein said tapered end of each adjustment screw means bears against the tapered surface ends of dowel pins respective to thrust plate means adjacent opposite projection face planes.

4. Apparatus for forming box blanks from corrugated paperboard sheet material having paired tool wheels for mounting material forming tools on the perimeter thereof within an axial length segment of such wheel perimeter, respective wheels of a pair being secured to respective parallel axle shafts for rotation about a shaft axis, a circumferential slot portion of each wheel being axially positioned laterally of said tool segment, said slot being characterized by oppositely facing side walls in respective parallel planes that are substantially perpendicular to said axle shaft axis, yoke means having opposite parallel side faces and substantially perpendicular end faces secured to a frame portion of said apparatus, projecting finger portions of said yoke means meshed between said slot side wall planes, bearing surface means disposed on said opposite side faces of said yoke means between said slot side walls and said yoke side faces, said bearing surface means being secured to dowel pin means, said dowel pin means being slidably confined within a dowel bore portion of said yoke fingers, a threaded bore in said yoke fingers extending from an end face to an intersecting junction with said dowel bore, adjustment screw means having a tapered end turned into said threaded bore to bear against tapered ends respective to said dowel pin means.

5. Apparatus as described by claim 4 wherein each bearing surface means is secured to at least two dowel pins.

6. Apparatus as described by claim 4 wherein said adjustment screw tapered end bears against two dowel pins in the same dowel bore respective to bearing surfaces that are adjacent opposite yoke finger side faces.

* * * * *